July 16, 1968

O. O. BAKER ET AL 3,392,992

TRAILER CONSTRUCTION

Filed May 11, 1966

INVENTORS
OWEN O. BAKER
DENNIS O. BAKER

BY:

*Woodhams, Blanchard & Flynn*

ATTORNEYS

July 16, 1968
O. O. BAKER ET AL
3,392,992
TRAILER CONSTRUCTION
Filed May 11, 1966
3 Sheets-Sheet 2
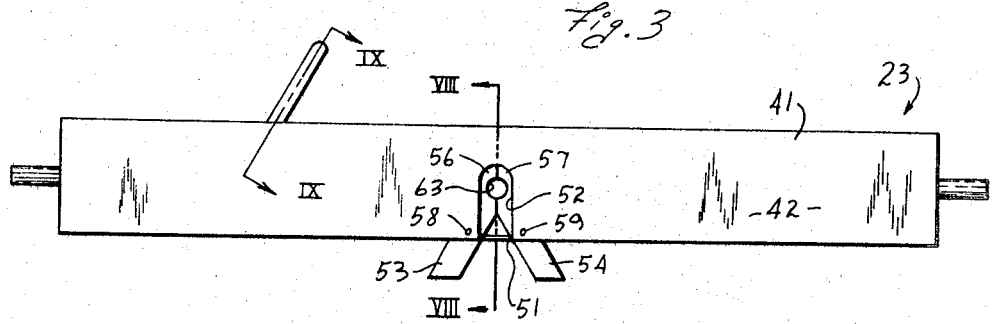
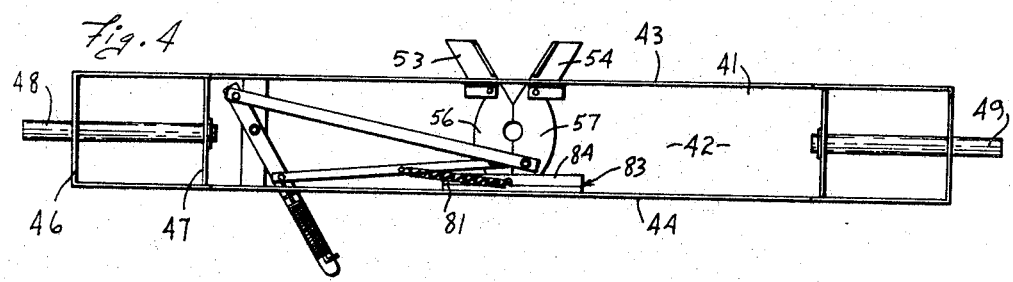
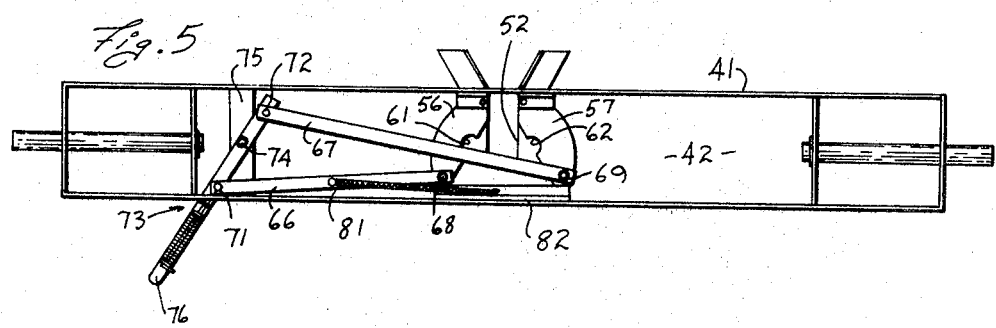
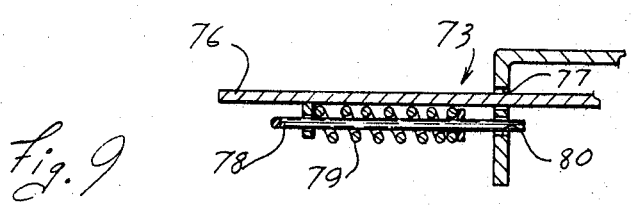
INVENTORS
OWEN O. BAKER
DENNIS O. BAKER
BY: Woodhams, Blanchard & Flynn
ATTORNEYS July 16, 1968   O. O. BAKER ET AL   3,392,992
TRAILER CONSTRUCTION Filed May 11, 1966   3 Sheets-Sheet 3

INVENTORS
OWEN O. BAKER
DENNIS O. BAKER
BY: Woodhams, Blanchard & Flynn
ATTORNEYS United States Patent Office 3,392,992
Patented July 16, 1968

3,392,992
TRAILER CONSTRUCTION
Owen O. Baker, R.F.D. 1, Sturgis Township, St. Joseph County, Mich. 49001, and Dennis O. Baker, 414 S. 4th, Sturgis, Mich. 49001
Filed May 11, 1966, Ser. No. 549,264
12 Claims. (Cl. 280—423)

ABSTRACT OF THE DISCLOSURE

A trailer hitch adapted to be mounted on the bed of a pickup truck and including a pair of end frames positioned adjacent opposite sides of the bed and removably secured thereto. A cross member extends between the end frames and is pivotally supported therein. The end frames are provided with lock means to permit the cross member to be readily detached. The cross member has a coupling means thereon, such as a pair of movable jaw members, to permit a cooperable coupling means, such as a king pin, of a trailer to be coupled thereto. The hitch structure is preferably used with a travel trailer having an elongated forward portion which extends over the bed of the pickup truck with the hitch being located between the rear wheels of the truck to transfer a substantial portion of the trailer weight directly onto the rear wheels.

---

This invention relates to a mobile home and/or travel trailer construction and a trailer hitch therefor, and more particularly, relates to a trailer hitch which is especially adapted to be mounted on the bed of a pickup truck close to and located between the rear wheel wells of the truck so that the pickup truck can be used for pulling the trailer.

A wide variety of trailer hitch constructions have been suggested heretofore and many of these are generally satisfactory in use. In almost all cases with which we are familiar, the trailer hitch consists of a part projecting rearwardly from the truck unit and a cooperating part projecting forwardly from the trailer unit whereby there is provided a substantial space between the truck unit and the trailer whereby the truck-trailer assembly is of substantial length.

We have considered ways to improve trailer constructions and hitches therefor to make it possible to provide larger trailers for a truck-trailer assembly of a given length or to shorten the length of a truck-trailer assembly for a trailer unit of a given size is compared with the conventional units referred to above. In doing so, we have recognized that pickup trucks and similar vehicles, such as flatbed trucks, which have a load-carrying compartment rearward of the driver's compartment and whose sides do not extend upwardly very far can be used for hauling trailers and that the trailers can be made so that a portion thereof extends over the bed of the pickup truck. A trailer hitch can be provided between the aforesaid frontward portion of the trailer and the bed of the pickup truck whereby it can become possible to provide a relatively large size trailer, for the combined length of the truck-trailer assembly, and to provide a hitch therefor which can be relatively easily connected by moving the bed of the pickup truck underneath the forwardly projecting portion of the trailer and by connecting the hitch to a suitable kingpin on the underside of the frontward portion of the trailer.

Accordingly, it is an object of this invention to provide an improved mobile home or travel trailer construction which is adapted to be moved by means of a pickup truck or the like.

It is a further object of this invention to provide an improved travel trailer or mobile home construction in which the forward portion of the trailer extends over the bed of the pickup truck so that the combined length of the truck-trailer assembly can be reduced to a minimum for a trailer unit of a given size.

It is a further object of this invention to provide an improved hitch for coupling a trailer unit of the type referred to above to the pickup truck, the hitch being especially adapted to be mounted on the bed of the pickup truck adjacent to and between the rear wheel wells of the pickup truck.

It is a further object of this invention to provide an improved trailer hitch, as aforesaid, which is adapted to releasably engage a kingpin projecting downwardly from the frontward portion of the trailer unit in order to couple the trailer to the truck, the hitch making it possible for the trailer to pivot with respect to the truck for steering purposes.

It is a further object of this invention to provide an improved trailer hitch, as aforesaid, which is of relatively simple and inexpensive construction, which can be rigidly secured to the bed of the pickup truck in a simple and reliable fashion and which can releasably lock the kingpin on the trailer to the truck in an easy and convenient fashion.

Other objects and advantages of the invention will become apparent to persons acquainted with equipment of this type upon reading the following description and inspecting the accompanying drawings, in which:

FIGURE 3 is a top plan view of the trailer hitch with the jaws thereof being shown in a closed position.

FIGURE 4 is a bottom view of the trailer hitch with the jaws thereof being shown in a closed position.

FIGURE 5 is a bottom view of the trailer hitch with the jaws being shown in an open position.

FIGURE 9 is an enlarged sectional view taken on the line IX—IX of FIGURE 3.

Figure 1:
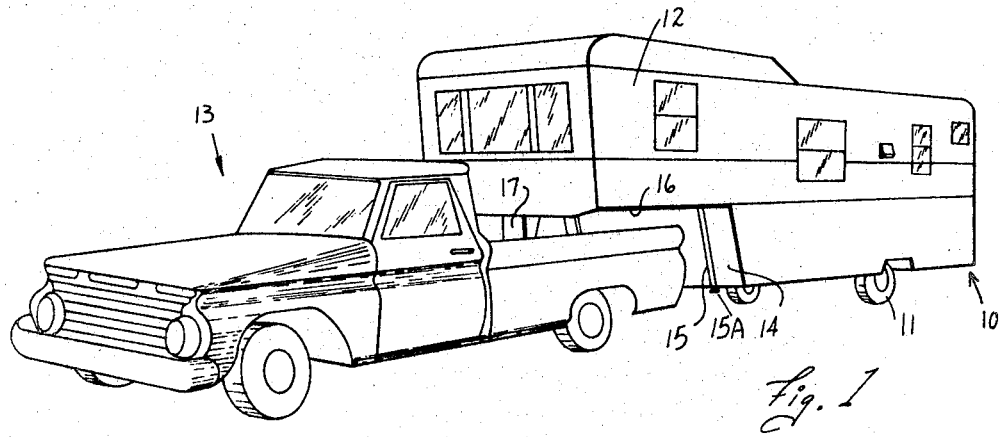
FIGURE 1 is a perspective view of a pickup truck and a trailer unit embodying the invention.

Referring to FIGURE 1, according to the invention, there is provided a trailer 10 having at least one set of ground-engaging wheels 11. The trailer 10 has a frontward portion 12 which is so constructed and arranged that it can be positioned directly over the bed of a pickup truck 13, there being sufficient clearance between the frontward portion 12 and the pickup truck to permit pivoting of the trailer with respect to the pickup truck for steering purposes as well as limited relative forward and rearward movement of the truck with respect to the trailer for coupling purposes, all of which can be carried out without interference between the truck and the trailer. The lower frontward wall 14 of the trailer 10 has a plurality of jacks, one of which is indicated at 15, said jacks being either hydraulically or screw operated and having a ground-engaging foot 15A whereby when the trailer is disconnected from the pickup truck, the foot 15A can be moved into engagement with the ground in order to prevent tipping and rolling movement of the trailer.

Figure 6:
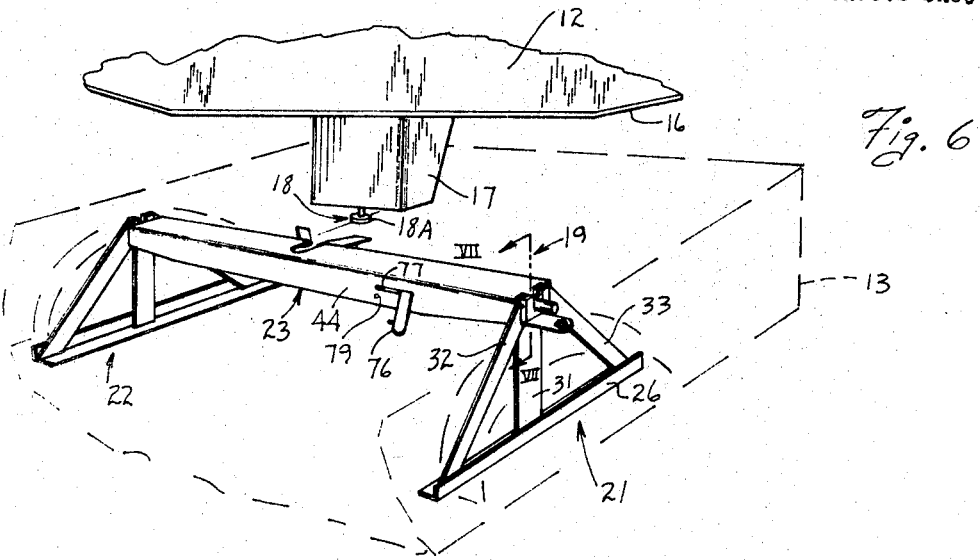
FIGURE 6 is a perspective view of the trailer hitch and the lower portion of the trailer, including the kingpin, and illustrating the manner in which the kingpin is brought toward coupling engagement with the hitch.

The frontward portion 12 of the trailer 10 has a lower surface 16 adapted directly to overlie the bed of the pickup truck 13. A well 17 projects downwardly from the lower surface 16. A kingpin 18 (FIGURE 6) extends downwardly from the well 17 and is adapted to be releasably coupled to the pickup truck 13 by means of the hitch structure 19 described in greater detail hereinafter. Desirably, various types of devices, such as batteries, for supplying power to the equipment inside the trailer, can be stored within the well 17. It will be apparent that the shape of the trailer and the dimensions thereof and other specific details of the construction thereof form no part of the present invention and, hence, further description of the trailer 10 is believed to be unnecessary.

Figure 2:
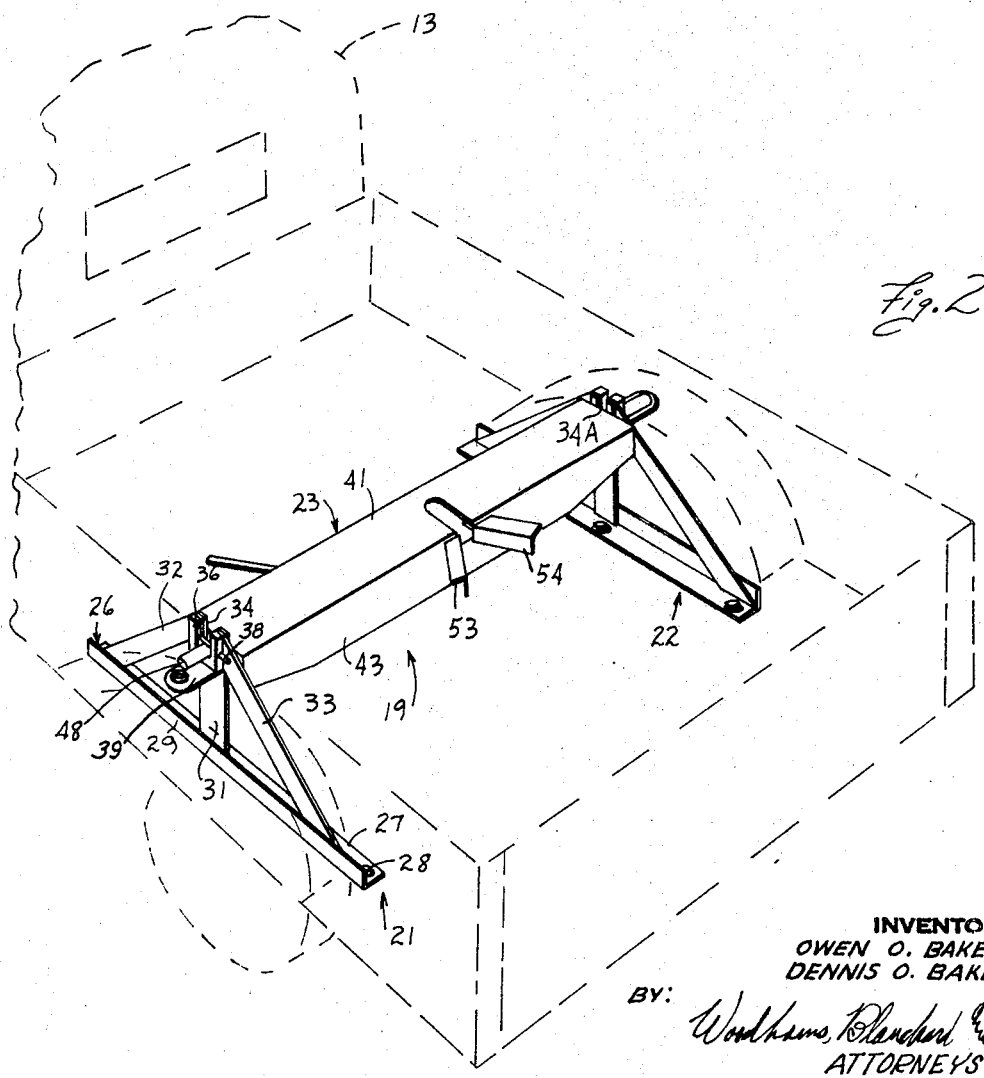
FIGURE 2 is a perspective view of the trailer hitch embodying the invention, said hitch being shown mounted on the bed of a pickup truck which is schematically illustrated in broken lines.

Referring to FIGURE 2, the trailer hitch structure 19 is comprised of a pair of end frames 21 and 22 (FIGURES 2 and 6) and a cross structure 23 which extends between and is pivotally supported on said end frames. The end frames 21 and 22 are substantially identical. Therefore, only end frame 21 will be described in detail and it will be understood that end frame 22 is made of the same parts and corresponding parts of the end frame 22 will be identified by the same reference numerals with the suffix "A" added thereto.

Figure 7:
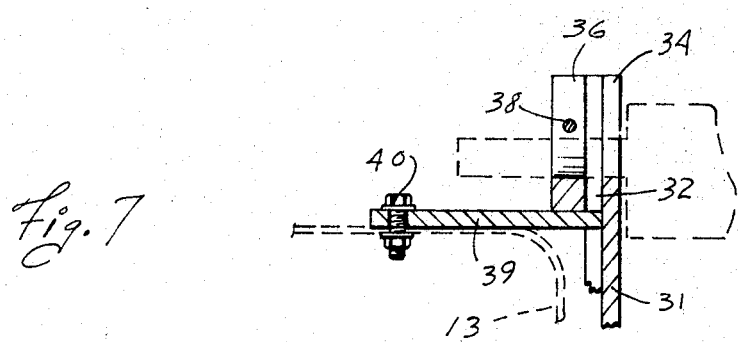
FIGURE 7 is an enlarged sectional view taken on the line VII—VII of FIGURE 6 with the cross structure indicated in broken lines.
Figure 8:
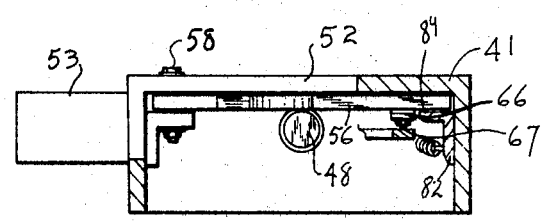
FIGURE 8 is an enlarged section taken on the line VIII—VIII of FIGURE 3.

The end frame 21 is comprised of an angle iron 26 having a horizontal flange 27 secured to the bed of the pickup truck 13 by bolts 28 at a location just inwardly of the rear wheel well of the pickup truck. The angle iron 26 has an upright flange 29 to which are secured, as by welding, a central upright bar 31 and a pair of end braces 32 and 33 which are inclined in an upward direction toward each other and toward the upper end of the upright bar 31. An upwardly opening generally U-shaped slot 34 (FIGURES 2 and 7) is formed in the upper end of a block 36. The U-shaped slots 34 and 34A are transversely aligned with each other for reasons which will be pointed out hereinbelow. The upper end of the brace 32 is overlapped with and is secured, as by welding, to the block 36 on one side of the slot 34 and the other inclined brace 33 is similarly secured to the upper end of the block 36 on the opposite side of the slot 34. A fastening screw 38 is adapted to be extended between the legs of the block 36 to secure the cross structure against vertical movement with respect to the end frames as described in greater detail hereinbelow.

In the particular embodiment shown, the hitch is adapted for use with trucks having wheel wells within the pickup box and thus includes a transverse fastening ear 39 rigidly secured to and extending sidewardly from the central bar 31. The block 36 is mounted on the upper surface of the ear 39. The transverse ear 39 is adapted to be secured to the uppermost point on the wheel well of the pickup truck preferably by a bolt 40. Thus, the end frames 21 and 22 are secured to the pickup truck both at their lower ends and at a position close to their upper ends whereby the end frames 21 and 22 are fixed rigidly to the pickup truck. It will be apparent that the connection and disconnection of the end frames 21 and 22 to the pickup truck can be carried out easily and conveniently by suitable manipulation of the bolts. Moreover, in order to adapt a conventional pickup truck to use with the trailer hitch according to the invention, it is merely necessary to drill the necessary number of holes through the bed and wheel wells thereof which can be carried out easily and inexpensively. Should it be desired to use the hitch with trucks not having internal wheel wells, it is contemplated that the end frames may be braced upright by any convenient additional means not shown.

The cross structure 23 (FIGURES 2-5) is comprised of a generally channel-shaped member 41 having a horizontal web 42 and a pair of vertically extending flanges 43 and 44. Two pairs of laterally spaced transverse plates 46 and 47 extend between the flanges 43 and 44 (FIGURES 4 and 5) at the opposite ends of the member 41 and said plates are secured to said flanges in any suitable manner, such as by welding. Pivot shafts 48 and 49 extend through suitable openings in the pairs of plates 46 and 47 and are secured thereto as by welding. The pivot shafts 48 and 49 extend lengthwise of the member 41 and beyond the ends thereof, said pivot shafts 48 and 49 being coaxial with each other. The pivot shaft 48 is rotatably received within the slot 34 and is releasably retained within said slot by the screws 38. The shaft 49 is rotatably received and retained in the slot 34A in a corresponding manner. Thus, the cross member 41 is rotatably supported on the end frames 21 and 22 so that it can pivot as needed during use of the trailer hitch.

The cross member 41 has an opening or notch 51 in the upper edge of rearward flange 43 thereof and the web 42 has a slot 52 which extends part way thereacross. The slot 52 communicates with and constitutes an extension of the opening 51 whereby the kingpin on the trailer can be moved forwardly through the opening 51 and then into the slot 52. A pair of guide members 53 and 54 are fixedly secured to the cross member 41 and extend rearwardly from the flange 43 thereof. The guide members 53 and 54 diverge in a direction away from the flange 43 and define a substantially V-shaped opening whose apex is aligned with and disposed within the slot 52 whereby the king pin is guided by said guide members into said slot as said kingpin moves forwardly with respect to the cross structure of the trailer hitch.

A pair of jaw members 56 and 57 are pivotally mounted at 58 and 59 at corresponding one ends thereof on the cross member 41 on opposite sides of the slot 52 between the web 42 and suitable angle brackets 55 and 60 fixed to the flange 41. The other, here forward ends of the jaw members 56 and 57 are free from connection to the cross member 41 so that said jaw members are free to move toward and away from each other. The opposing, adjacent edges of the jaw members 56 and 57 have recesses 61 and 62 which, when the jaw members are in their closed position, mate to define an opening 63 (see FIGURES 3 and 4) through which the kingpin 18 extends. The opening 63 is vertically aligned with the slot 52. When the jaw members 56 and 57 are in their closed positions, the same hold the kingpin against movement so that the kingpin is locked to the cross member 41, although said kingpin can pivot with respect to said cross member for steering purposes. When the jaw members 56 and 57 are moved apart, the kingpin can be freely moved within and out of the slot 52.

A pair of link members 66 and 67 are pivotally connected at 68 and 69 at corresponding one ends thereof to the free ends of the jaw members 56 and 57, respectively. The opposite ends of the link members 66 and 67 are pivotally connected at 71 and 72 to a lever 73. The lever is pivotally connected at 74 through a crosspiece 75 which is secured to the cross member 41. Thus, when the lever is pivoted toward the jaw members 56 and 57, said jaw members are moved together. When the lever 73 is pivoted away from the jaw members 56 and 57, said jaw members are moved apart.

The lever 73 has a handle 76 which extends through a slot 77 (FIGURE 6) in the flange 44 of the cross member 41 whereby the lever can be manually moved between the two positions described above. A locking pin 78 is mounted on the underside of the handle and it is urged by a spring 79 toward the flange 44. The flange 44 has a pair of openings below and located adjacent the ends of the slot 77, indicated at 80 in FIGURE 6. The locking pin 78 is extendable through one of said openings when the lever is at either end of the slot 77 whereby the jaw members 56 and 57 can be releasably locked in an open or a closed position.

A coil spring 81 is anchored at one end on a flange 82 of the angle iron 83 at a position adjacent the flange 44 and substantially aligned with the slot 52. The other end of the spring 81 is anchored to the link member 66 at a position substantially midway between the ends thereof. The coil spring 81, therefore, continuously urges the jaw members 56 and 57 to a closed position in order to prevent inadvertent opening of the jaws. The other flange 84 of the angle is spaced from the web 42 to form a slot therebetween in which the jaws 56 and 57 are continuously guided.

ASSEMBLY AND OPERATION

Considering first the coupling of the trailer to the pickup truck, the well 17 and the kingpin 18 would extend below the upper edge of the tailgate of the truck. Therefore, in order to make it possible to couple the trailer and the truck together, either the tailgate of the truck is dropped or preferably the front end of the trailer is pivoted upwardly so that the well and the kingpin clear the tailgate. Either the trailer is moved forwardly toward the truck or the truck is backed up toward the trailer so that the kingpin moves toward the trailer hitch 19. At this time, the jaws 56 and 57 are in their closed position and the locking pin 78 is released. As the kingpin 18 approaches the cross member 41, it will be received between the guide members 53 and 54 and it will be moved thereby toward 52. When the kingpin contacts the jaw members 56 and 57, it forces them apart and the pin then moves to a position where it can be engaged by the recesses 61 and 62 of the jaw members 56 and 57. The jaw members 56 and 57 are then automatically moved into their closed positions by the spring 81 whereby the kingpin is releasably locked to the cross member 41 by the jaw members 56 and 57. It will be noted that the kingpin has an enlarged head 18A which would be received below the jaw members 56 and 57 whereby the kingpin would be held against vertical movement with respect to the jaw members. Moreover, the jaw members 56 and 57 can be locked in their closed position by positioning the locking pin 78 into one of the openings 80 in the flange 44. Thus, the kingpin 18 will be reliably locked to the trailer hitch so that the kingpin cannot move forwardly or rearwardly with respect thereto, although it is capable of limited pivotal movement with respect thereto and within the opening 63 for steering purposes.

The trailer can be disconnected from the pickup truck by reversing the steps described above.

By mounting the cross member 41 for pivotal movement, the jaw members can move upwardly and downwardly to a limited extent in order to make it possible to more easily couple the trailer to the pickup truck and so as to make it possible for the hitch to accommodate at least minor irregularities in the road surface when the truck is pulling the trailer without there being any danger of breakage of the parts.

While a particular preferred embodiment of the invention has been described, it will be apparent that the invention contemplates such changes or modifications therein as lie within the scope of the appended claims.

The embodiments of the invention in which an exclusive property or privilege is claimed are defined as follows:

1. A mobile home or travel trailer construction, comprising:
   a trailer having at least one set of ground-engaging wheels and having an enclosed living space including a forwardly extending front portion which is offset upwardly from the remainder of the trailer to provide a space below the front portion of said trailer, said trailer having a lower front wall portion and an upper front wall portion positioned forwardly of said lower front wall portion, and a generally horizontal base wall connecting the lower end of said upper front wall portion and the upper end of said lower front wall portion;
   a coupling element mounted on said horizontal base wall and extending downwardly therefrom;
   a motor vehicle comprising a pickup truck having a driver's compartment and upright side walls defining an open-topped load-carrying compartment rearwardly of the driver's compartment;
   a trailer hitch detachably mounted upon the bed of the load-carrying compartment of said motor vehicle, said trailer hitch comprising a pair of end frames detachably mounted on the bed of the load-carrying compartment of the motor vehicle and located adjacent the respective side walls thereof, a cross member extending between said end frames and being pivotally supported thereon, said cross member being positioned at a height above said bed close to the upper edges of said side walls and a coupling means mounted on said cross member for permitting attachment of the trailer to said vehicle, said coupling element being receivable on said coupling means with said coupling means locking said coupling element to said cross member;
   said trailer being positionable so that said front portion directly overlies said load-carrying compartment of said vehicle and said coupling element is connected to said trailer hitch whereby said trailer can be pulled by said motor vehicle.

2. A mobile home or travel trailer construction as defined in claim 1, wherein:
   said cross member comprises a channel-shaped member having shaft means extending from the opposite ends thereof with said shaft means being pivotally supported on said end frames;
   said coupling element comprises a king pin;
   said coupling means comprises a pair of jaw members pivotally supported on the web of said channel-shaped member and being freely movable between a first position in which the king pin on the trailer can be freely moved between said jaw members and a second position in which said jaw members lock the king pin to said channel-shaped member.

3. A mobile home or travel trailer construction as defined in claim 2, further including:
   a plurality of jacks, each having a ground-engaging foot, mounted on said lower front wall portion of said trailer for upward and downward movement whereby the front end of the trailer can be supported by said jacks when it is disconnected from said motor vehicle.

4. A trailer hitch mounted on the bed of a pickup truck, comprising:
   upright spaced-apart end frames adapted to be individually fixedly secured to the bed of a pickup truck adjacent opposite upright side walls thereof;
   an elongated cross member extending transversely across the bed of said truck with the opposite ends thereof being supported by said end frames, said cross member being positioned at a height above said bed close to the upper edges of said side walls; and
   coupling means mounted on said cross member and adapted to coact with complementary coupling means on a trailer for permitting said trailer to be interconnected to said truck.

5. A trailer hitch as defined in claim 4, further including:
   lock means for securing opposite ends of said cross member to the respective end frames, said lock means being movable from a first locked position to a second unlocked position for permitting said cross member to be removed from said end frames, said cross member being supported only by said end frames whereby the central portion of the bed of said truck is substantially free of obstructions.

6. A trailer hitch as defined in claim 5, wherein:
   each of said end frames includes an open-ended slot in which is received the end of said cross member; and
   said lock means includes a lock member movably mounted on each of said end frames and extending across the open end of said slot when in said first position for securing said cross member to said end frame, said lock member being movable to said second position to unblock the open end of said slot whereby said cross member can be easily removed from said end frame.

7. A trailer hitch as defined in claim 4, wherein:
said end frames each are substantially triangular with a base member secured to the bed of said truck, a pair of end braces extending upwardly from the opposite ends of the base member and inclined toward each other and joined together at their upper ends, a slot being formed at the upper ends of said braces;
said end frames each further includes a transverse fastening flange rigidly secured thereto adjacent the upper ends of said braces and extending outwardly toward the adjacent side of the bed, said flange being vertically positioned above said bed and being adapted to be fixedly secured to the sidewall structure of the truck surrounding the bed.

8. A trailer hitch as defined in claim 7, wherein:
the flanges are adapted to be fixedly secured to the sidewall structure which comprises the vehicle wheel wells.

9. A trailer hitch as defined in claim 14, wherein:
said cross member is provided with shaft means at opposite ends thereof, said shaft means being pivotally mounted in said end frames for permitting relative pivotable movement between said cross member and said truck;
said coupling means comprising a pair of jaw members pivotally mounted on said cross member and movable between an opened position in which a king pin on a trailer can be freely moved between said jaw members and a closed position in which said jaw members lock said king pin to said cross member; and
resilient means biasing said jaw members toward said closed position and locking said jaw members in said closed position.

10. A trailer hitch as defined in claim 9, wherein:
said jaw members are provided with recesses in the opposing edges thereof which meet when the jaw members are in the closed position to define an opening through which the king pin extends; and
a pivot pin interconnecting each of said jaw members to said cross member for permitting relative pivotable movement therebetween, said pivot pins being longitudinally displaced from said king pin opening in a direction toward the rearward end of said truck.

11. A trailer hitch mountable on the bed of a pickup truck, comprising:
spaced-apart end frame means adapted to be fixedly secured to the bed of a pickup truck;
a channel-shaped cross member extending between said end frame means, said cross member having a transverse slot provided in the web thereof and one of the flanges of said cross member having an opening therein communicating with said slot;
a pair of jaw members pivotally mounted on said cross member and movable between a position in which a king pin on a trailer can be freely moved between said jaws and a second position in which said jaw members lock said king pin to said cross member when said king pin is in position within said slot, said jaw members extending on opposite sides of and encircling the king pin when it is positioned in the slot;
said pair of jaw members being pivotally connected at corresponding one ends thereof to said cross member with the other ends thereof being free to be moved toward and away from each other, said jaws having recesses in their opposing edges which mate when the jaws are closed to define an opening through which the king pin extends; and
a pair of links respectively connected to the other ends of said jaw members and a lever connected to said links whereby movement of said lever will move said jaws between said positions, said lever having a handle projecting through a slot in one of the flanges of said cross member and a locking pin mounted on said handle extendable through openings in said one flange of said cross member to lock said jaw members in said positions.

12. A trailer hitch mountable on a motor vehicle, comprising:
upright spaced-apart end frames adapted to be individually fixedly secured to the vehicle adjacent opposite sides of the load carrying area thereof;
an elongated cross member adapted to extend transversely across said load carrying area between said end frames with the opposite ends thereof being pivotally supported by said end frames;
coupling means mounted on said cross member and adapted to coact with complementary coupling means on a trailer for permitting said trailer to be interconnected to said motor vehicle;
lock means for securing opposite ends of said cross member to the respective end frames, said lock means being movable from a first locked position to a second unlocked position for permitting said cross member to be removed from said end frames, said cross member being supported only by said end frames whereby the central portion of the load carrying area of said motor vehicle is substantially free of obstructions;
each of said end frames includes an open-ended slot in which is received the end of said cross member; and
said lock means includes a lock member movably mounted on each of said end frames and extending across the open end of said slot when in said first position for securing said cross member to said end frame, said lock member being movable to said second position to unblock the open end of said slot whereby said cross member can be easily removed from said end frame.

References Cited

UNITED STATES PATENTS

| | | | |
|---|---|---|---|
| D. 194,455 | 1/1963 | McIntosh | D14—3 |
| D. 198,203 | 5/1964 | Ferguson | D14—3 |
| 1,996,425 | 4/1935 | Ketel | 280—435 |
| 2,152,279 | 3/1939 | Randall et al. | |
| 2,363,170 | 11/1944 | Fontaine | 296—28 |
| 2,387,625 | 10/1945 | Walther et al. | |
| 2,676,033 | 4/1954 | Housh et al. | 280—438 |
| 2,793,068 | 5/1957 | Tenenbaum | 296—28 |
| 2,925,286 | 2/1960 | Hodges et al. | 280—423 X |
| 3,055,677 | 9/1962 | Smith | 280—104.5 |
| 3,164,398 | 1/1965 | Lugash | 280—423 |

FOREIGN PATENTS

| | | |
|---|---|---|
| 811,601 | 4/1959 | Great Britain. |
| 1,320,238 | 1/1963 | France. |

LEO FRIAGLIA, *Primary Examiner.*

UNITED STATES PATENT OFFICE
CERTIFICATE OF CORRECTION

Patent No. 3,392,992                                         July 16, 1968

Owen O. Baker et al.

It is certified that error appears in the above identified patent and that said Letters Patent are hereby corrected as shown below:

Column 6, line 3, cancel "adapted to be". Column 7, line 1, claim reference numeral "14" should read -- 4 --.

Signed and sealed this 9th day of December 1969.

(SEAL)
Attest:

Edward M. Fletcher, Jr.                              WILLIAM E. SCHUYLER, JR.

Attesting Officer                                              Commissioner of Patents